(12) United States Patent
Asano (10) Patent No.: US 9,677,418 B2
(45) Date of Patent: Jun. 13, 2017

(54) TURBINE HOUSING AND TURBOCHARGER

(71) Applicant: TOYOTA JIDOSHA KABUSHIKI KAISHA, Toyota-shi, Aichi-ken (JP)

(72) Inventor: Akihiro Asano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 148 days.

(21) Appl. No.: 14/679,122

(22) Filed: Apr. 6, 2015

(65) Prior Publication Data

US 2015/0292354 A1 Oct. 15, 2015

(30) Foreign Application Priority Data

Apr. 15, 2014 (JP) .................. 2014-083709

(51) Int. Cl.

| F02B 29/04 | (2006.01) |
| F04B 17/00 | (2006.01) |
| F04B 35/00 | (2006.01) |
| F01D 19/02 | (2006.01) |
| F01D 25/12 | (2006.01) |
| F02B 39/02 | (2006.01) |
| F01D 25/14 | (2006.01) |
| F02B 37/00 | (2006.01) |
| F02B 39/00 | (2006.01) |

(52) U.S. Cl.
CPC .............. *F01D 25/12* (2013.01); *F01D 25/14* (2013.01); *F02B 37/00* (2013.01); *F02B 39/005* (2013.01); *F02B 39/02* (2013.01); *F01P 2060/12* (2013.01); *F05D 2220/40* (2013.01); *Y02T 10/144* (2013.01)

(58) Field of Classification Search
CPC .......... F01D 25/12; F01D 25/14; F02B 37/00; F02B 39/005; F02B 39/02; F01P 2060/12; F05D 2220/40; Y02T 10/144
USPC .......... 60/605.3, 599; 417/406–407; 415/108, 415/201, 203
See application file for complete search history.

(56) References Cited

U.S. PATENT DOCUMENTS 2,064,313 A * 12/1936 Moody ................... F03B 3/183
                                                            415/129
2,866,617 A * 12/1958 Land ...................... F01D 25/14
                                                            415/205

(Continued)

FOREIGN PATENT DOCUMENTS

DE          10344868 A1 *  4/2005  ............. F01D 25/12
FR          2 363 699 A1       3/1978

(Continued)

OTHER PUBLICATIONS

Partial Translation of Mar. 29, 2016 Office Action issued in Japanese Patent Application No. 2014-083709.

*Primary Examiner* — Thai Ba Trieu
(74) *Attorney, Agent, or Firm* — Oliff PLC (57) ABSTRACT

A turbine housing for an internal combustion engine, the turbine housing includes a coolant passage and exhaust gas flow path. The exhaust gas flow path is configured to pass exhaust gas of the internal combustion engine, a turbine wheel is arranged in the exhaust gas flow path, the exhaust gas flow path include a first portion, the first portion is disposed further on the exhaust gas downstream side than the turbine wheel in the exhaust gas flow path, and the inner diameter of the first portion gradually increases toward the exhaust gas downstream side.

2 Claims, 6 Drawing Sheets

| LENGTH L (mm) | 0≤L<25 | 25≤L<40 | L≥40 |
|---|---|---|---|
| ANGLE θ (°) | L±5 | $\frac{L+50}{3}$±5 | 30±5 |
| DISTANCE D (mm) | 0≤D<5 | | |

(56) References Cited

U.S. PATENT DOCUMENTS

| | | | | |
|---|---|---|---|---|
| 4,098,073 A | * | 7/1978 | Adkins | F01D 25/30 |
| | | | | 415/914 |
| 4,147,467 A | | 4/1979 | Leicht et al. | |
| 4,515,524 A | * | 5/1985 | Fisher, Jr. | F03B 11/02 |
| | | | | 415/169.1 |
| 6,513,328 B2 | * | 2/2003 | Baeuerle | F01D 25/14 |
| | | | | 60/599 |
| 8,365,526 B2 | * | 2/2013 | Stiermann | F01D 25/14 |
| | | | | 60/599 |
| 2010/0208151 A1 | | 8/2010 | Utsunomiya | |
| 2011/0008158 A1 | | 1/2011 | Boening et al. | |
| 2012/0321455 A1 | | 12/2012 | Boening et al. | |
| 2013/0323021 A1 | * | 12/2013 | Bogner | F02C 6/12 |
| | | | | 415/116 |
| 2013/0343881 A1 | | 12/2013 | Joergl et al. | |
| 2014/0212277 A1 | | 7/2014 | Uesugi | |
| 2015/0167494 A1 | * | 6/2015 | Sumi | F01D 25/12 |
| | | | | 415/178 |
| 2015/0176429 A1 | * | 6/2015 | Oki | F01D 25/12 |
| | | | | 415/175 |
| 2015/0300203 A1 | * | 10/2015 | Fukuda | F01D 25/12 |
| | | | | 415/116 |

FOREIGN PATENT DOCUMENTS

| | | | | |
|---|---|---|---|---|
| GB | 628697 A | * | 9/1949 | F02C 3/36 |
| JP | S63-22346 U | | 2/1988 | |
| JP | 01178723 A | * | 7/1989 | |
| JP | 2008019711 A | * | 1/2008 | |
| JP | 2009-086181 A | | 4/2009 | |
| JP | 2010-038091 A | | 2/2010 | |
| JP | 2010048187 A | * | 3/2010 | |
| JP | 2012-255426 A | | 12/2012 | |
| JP | WO 2015097522 A1 | * | 7/2015 | F01D 25/145 |
| WO | 2009/106159 A1 | | 9/2009 | |
| WO | 2014/041411 A1 | | 3/2014 | |
| WO | WO 2015073358 A1 | * | 5/2015 | F01D 25/14 |

\* cited by examiner

EXHAUST GAS

| LENGTH L (mm) | 0≤L<25 | 25≤L<40 | L≥40 |
|---|---|---|---|
| ANGLE θ (°) | L±5 | $\frac{L+50}{3} \pm 5$ | 30±5 |
| DISTANCE D (mm) | 0≤D<5 | | |

TURBINE HOUSING AND TURBOCHARGER

INCORPORATION BY REFERENCE

The disclosure of Japanese Patent Application No. 2014-083709 filed on Apr. 15, 2014 including the specification, drawings and abstract is incorporated herein by reference in its entirety.

BACKGROUND OF THE INVENTION

1. Field of the Invention

The invention relates to a turbine housing and a turbocharger.

2. Description of Related Art

Japanese Patent Application Publication No. 2010-38091 (JP 2010-38091 A) discloses a turbine housing in which an exhaust gas flow path is disposed for passage of exhaust gas of an internal combustion engine and a turbine wheel is arranged in the exhaust gas flow path. In Japanese Patent Application Publication No. 2010-38091 (JP 2010-38091 A), a coolant passage for passage of a coolant is disposed in the turbine housing. The coolant passage is a part of a cooling system that has a radiator and a water pump. The turbine housing is cooled through heat exchange with the coolant that circulates in the coolant passage, and thus overheating of the turbine housing is suppressed.

SUMMARY OF THE INVENTION

In the turbine housing that is disclosed in Japanese Patent Application Publication No. 2010-38091 (JP 2010-38091 A), the exhaust gas in the exhaust gas flow path may be unnecessarily cooled through heat exchange with the turbine housing, when the turbine housing is cooled through the heat exchange with the coolant in the coolant passage. This may result in an unnecessary rise in the temperature of the coolant, which, in turn, may result in an unnecessary increase in the capacity of the radiator.

The invention provides a turbine housing and a turbocharger that are capable of suppressing an increase in the capacity of a radiator.

According to a first aspect of the invention, a turbine housing for an internal combustion engine, the turbine housing including a coolant passage and exhaust gas flow path. The exhaust gas flow path is configured to pass exhaust gas of the internal combustion engine, a turbine wheel is arranged in the exhaust gas flow path. The exhaust gas flow path includes a first portion. The first portion is disposed further on the exhaust gas downstream side than the turbine wheel in the exhaust gas flow path, and the inner diameter of the first portion gradually increases toward the exhaust gas downstream side.

According to a second aspect of the invention, a turbocharger for an internal combustion engine, the internal combustion engine includes an intake pipe and an exhaust gas pipe. The turbocharger includes a compressor, a turbine, a bearing housing and a rotating shaft. The compressor is disposed in the intake pipe. The compressor includes a compressor housing and a compressor impeller. The compressor impeller is disposed in the compressor housing. The turbine is disposed in the exhaust gas pipe. The turbine includes a turbine housing and a turbine wheel. The turbine wheel is disposed in the turbine housing. The turbine includes a coolant passage and an exhaust gas flow path. The exhaust gas flow path is configured to pass exhaust gas of the internal combustion engine, and the exhaust gas flow path includes a first portion. The first portion is disposed further on the exhaust gas downstream side than the turbine wheel in the exhaust gas flow path. The inner diameter of the first portion gradually increases toward the exhaust gas downstream side. The bearing housing connects the compressor and the turbine to each other. The rotating shaft connects the compressor and the turbine to each other and is rotatably supported by a bearing portion of the bearing housing.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
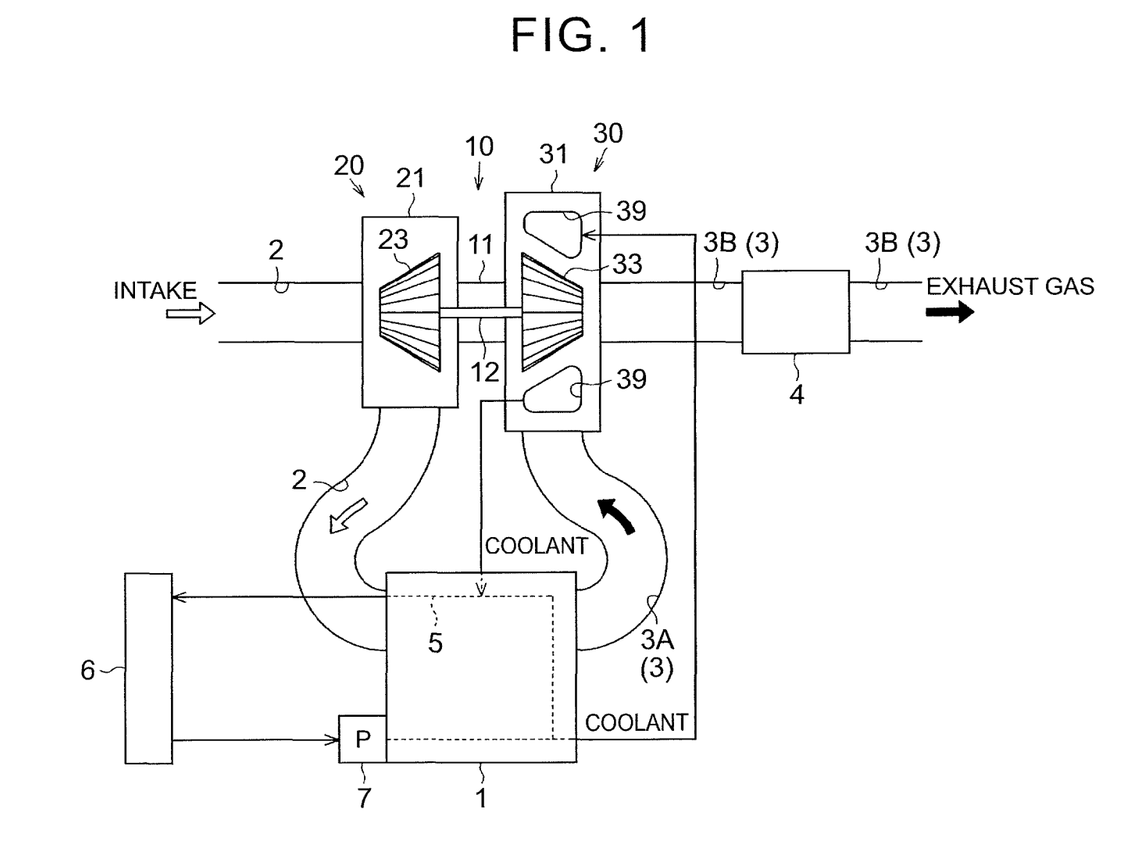
FIG. 1 is a schematic diagram illustrating a turbocharger that has a turbine housing and a structure in the vicinity of the turbocharger according to an embodiment.

Hereinafter, an embodiment of a turbine housing will be described. As illustrated in FIG. 1, a turbocharger 10 is provided with a compressor 20, a turbine 30 and a bearing housing 11. The compressor 20 is arranged in the middle of an intake pipe 2 of an internal combustion engine 1. The turbine 30 is arranged in the middle of an exhaust gas pipe 3 of the internal combustion engine 1. The bearing housing 11 connects the compressor 20 and the turbine 30 to each other.

The compressor 20 includes a compressor housing 21. A compressor impeller 23 is arranged in the compressor housing 21. The turbine 30 includes a turbine housing 31. A turbine wheel 33 is arranged in the turbine housing 31. The turbine wheel 33 and the compressor impeller 23 are connected. The turbine wheel 33 and the compressor impeller 23 rotate integrally by a rotating shaft 12. The rotating shaft 12 is rotatably supported by a bearing portion of the bearing housing 11.

Figure 2:
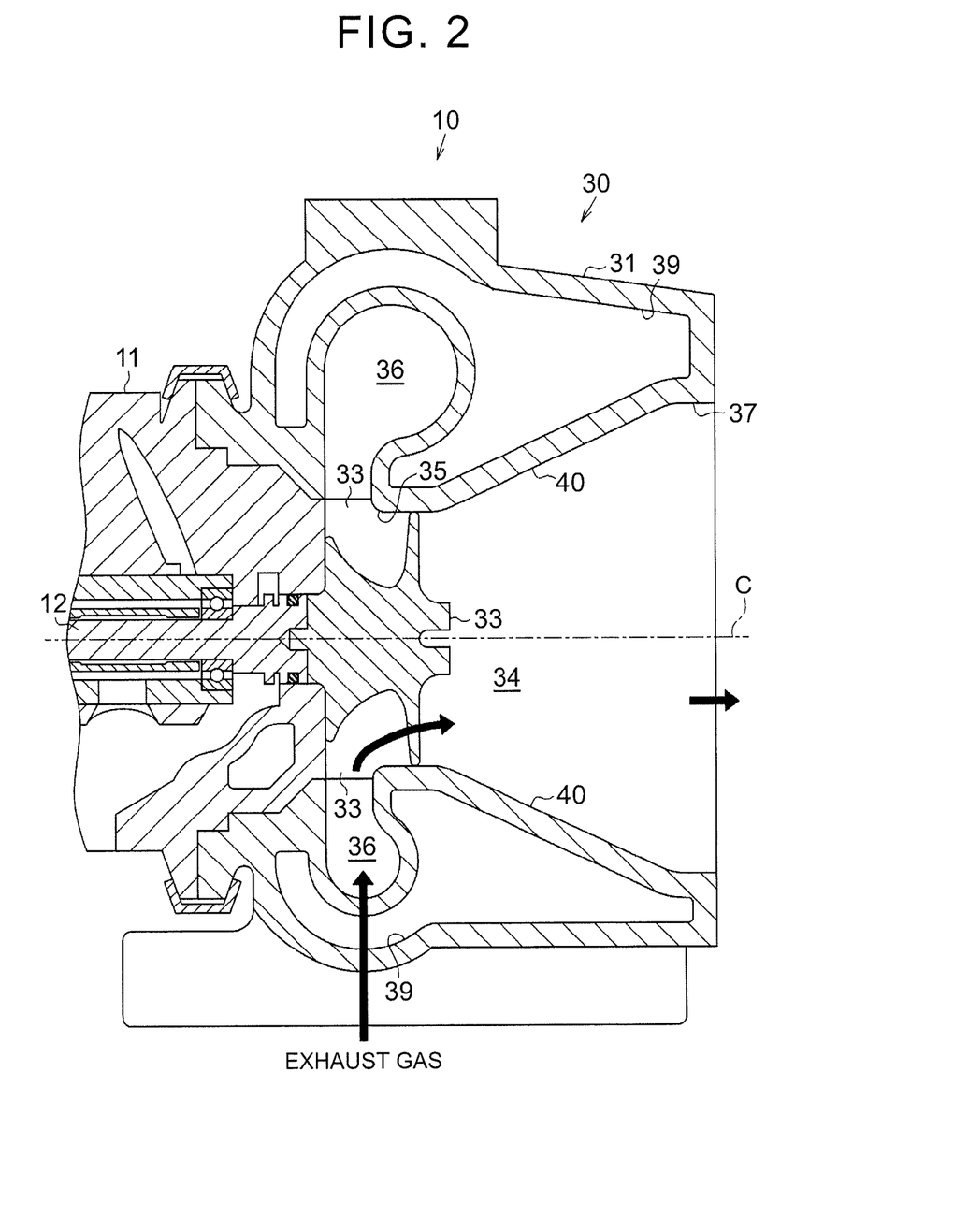
FIG. 2 is a cross-sectional view illustrating a cross-sectional structure of the turbine housing according to the embodiment.

Next, the turbine 30 and a structure in the vicinity of the turbine 30 will be described in detail. As illustrated in FIG. 2, a duct portion 34 that extends with a circular cross-sectional shape about an axis of rotation C of the turbine wheel 33 is disposed in the turbine housing 31.

One end portion (left side in FIG. 2) of the duct portion 34 is a wheel chamber 35. The turbine wheel 33 is arranged in the wheel chamber 35. A scroll passage 36 that extends in a spiral shape over the entire circumference around the turbine wheel 33 is disposed in the turbine housing 31. The scroll passage 36 is open in an annular shape over the entire circumference of a circumferential wall of the wheel chamber 35. A part of the exhaust gas pipe 3 further on the exhaust gas upstream side than the turbine 30 (upstream side exhaust gas pipe 3A) is connected to the scroll passage 36. In this embodiment, a passage including the duct portion 34 and the scroll passage 36 corresponds to an exhaust gas flow path of the internal combustion engine 1 through which exhaust gas passes.

The end portion of the duct portion 34 on the side opposite to the wheel chamber 35 (right side in FIG. 2) is a discharge portion 37 that discharges the exhaust gas outside the duct portion 34. A part of the exhaust gas pipe 3 further on the exhaust gas downstream side than the turbine 30 (downstream side exhaust gas pipe 3B) is connected to the discharge portion 37.

As illustrated in FIG. 1 or 2, supercharging to the internal combustion engine 1 is performed as follows in the turbocharger 10. As illustrated by the black arrows in the drawings, the exhaust gas that flows in the exhaust gas pipe 3 of the internal combustion engine 1 flows into the scroll passage 36 of the turbine housing 31 from the upstream side exhaust gas pipe 3A and is blown to the turbine wheel 33 from an inner portion of the scroll passage 36. Then, the energy of the exhaust gas flow causes the turbine wheel 33 to rotate, and the compressor impeller 23 rotates with the turbine wheel 33. As a result of the rotation of the compressor impeller 23, air that flows into the compressor housing 21 is pumped into a cylinder of the internal combustion engine 1 as illustrated by the white arrow in FIG. 1.

After the exhaust gas passes through the turbine wheel 33 in the turbine housing 31, the exhaust gas is discharged from the discharge portion 37 of the duct portion 34 to the downstream side exhaust gas pipe 3B. The exhaust gas that is discharged to the downstream side exhaust gas pipe 3B is purified by an exhaust gas control apparatus 4 (illustrated in FIG. 1) and then the exhaust gas is discharged outside the downstream side exhaust gas pipe 3B. The exhaust gas control apparatus 4 is disposed on the downstream side of the exhaust gas pipe 3B.

A coolant passage 39 that circulates a coolant and is shaped to surround the duct portion 34 and the scroll passage 36 is disposed to extend in the turbine housing 31. The turbine housing 31 is a water-cooled turbine housing that is cooled through heat exchange between the coolant and the turbine housing 31 with the coolant forced to be circulated in the coolant passage 39. As illustrated in FIG. 1, the internal combustion engine 1 is provided with an engine cooling system that has, for example, a water jacket 5, a radiator 6 and a water pump 7. The water jacket 5 is disposed in the internal combustion engine 1 to be supplied with the coolant. The radiator 6 cools the coolant. The water pump 7 pumps the coolant. In this embodiment, part of the coolant in the engine cooling system is supplied to the coolant passage 39 and is circulated during an operation of the internal combustion engine 1.

In the turbine housing 31, the exhaust gas that passes through the exhaust gas flow path (scroll passage 36 and duct portion 34) may also be unnecessarily cooled through heat exchange with the turbine housing 31 when the turbine housing 31 is cooled through the heat exchange with the coolant in the coolant passage 39 as illustrated in FIG. 1 or 2. This may result in an unnecessary rise in the temperature of the coolant, and may result in an unnecessary increase in the capacity of the radiator 6.

Therefore, in this embodiment, a portion (extending portion 40) of the duct portion 34 of the turbine housing 31 further on the exhaust gas downstream side than the turbine wheel 33 is shaped to have an inner diameter gradually increasing toward the exhaust gas downstream side, that is, has a tapered shape.

Hereinafter, an effect of the turbine housing 31 according to this embodiment will be described. The turbine housing 31 has a structure in which the passage cross-sectional area of the extending portion 40 of the duct portion 34 gradually increases toward the exhaust gas downstream side. Accordingly, the exhaust gas flow rate in the duct portion 34 (more specifically, the extending portion 40 of the duct portion 34) is smaller than that in a turbine housing in which the portion of the duct portion 34 further on the exhaust gas downstream side than the turbine wheel 33 extends with a constant inner diameter. Accordingly, a temperature boundary layer that is formed on an inner surface of the extending portion 40 thickens in the passage of the exhaust gas, and thus the heat transfer rate between the exhaust gas and the turbine housing 31 decreases, a cooling loss decreases, and the unnecessary rise in the temperature of the coolant caused when heat from the exhaust gas is received can be suppressed.

When the extending portion 40 of the turbine housing 31 is shaped to have a gradually increasing inner diameter, the surface area of the inner surface of the extending portion 40, that is, the area of the part where the heat exchange is performed between the exhaust gas passing through the extending portion 40 and the turbine housing 31 is greater than when the extending portion 40 is shaped to extend with a constant inner diameter. Accordingly, the heat transfer amount between the exhaust gas and the turbine housing 31 is likely to increase in the internal combustion engine 1, and the cooling loss may increase and the temperature of the coolant may rise unnecessarily.

Figure 3:
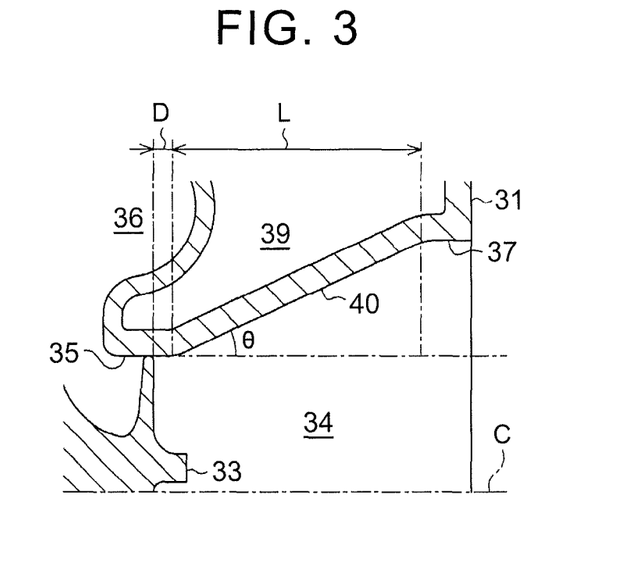
FIG. 3 is an enlarged cross-sectional view illustrating a cross-sectional structure in the vicinity of a turbine according to the turbine housing of the embodiment.

In view of this point, the extending portion 40 of this embodiment is shaped to be capable of suppressing an unnecessary increase in the heat transfer amount from the exhaust gas to the turbine housing 31 caused by an increase in the internal surface area of the extending portion 40. Hereinafter, the shape of the extending portion 40 will be described in detail. In the following description, the length of the extending portion 40 in the direction of the axis of rotation C will be referred to as "L (mm)", the angle formed by the inner surface of the extending portion 40 and the axis of rotation C will be referred to as "θ(°)", and the distance between a blade tip of the turbine wheel 33 and the extending portion 40 in the direction of the axis of rotation C will be referred to as "D (mm)" as illustrated in FIG. 3.

Figure 4:
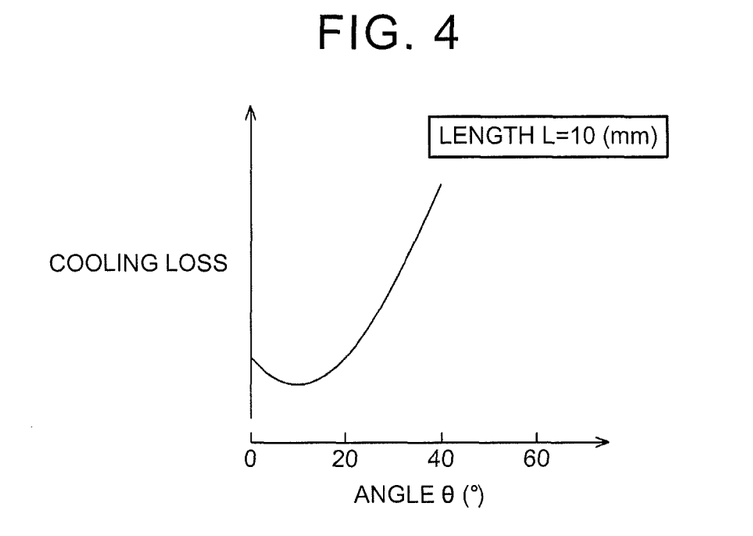
FIG. 4 is a graph illustrating a relationship between the length of an extending portion, the angle of an inner surface of the extending portion, and a cooling loss according to the embodiment.
Figure 5:
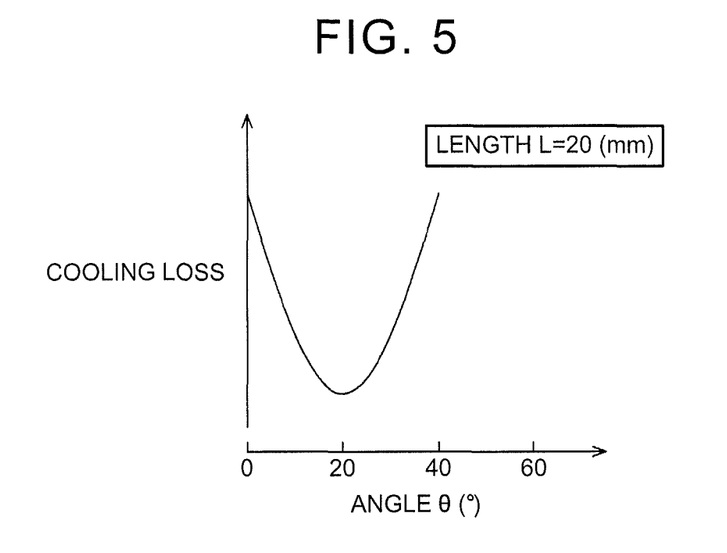
FIG. 5 is a graph illustrating a relationship between the length of the extending portion, the angle of the inner surface of the extending portion, and the cooling loss according to the embodiment.

FIGS. 4 and 5 illustrate relationships between the length L, the angle θ, and the cooling loss in the turbine 30 in an area where the length L is small (0≤L<25). This relationships are relationships obtained from results of various experiments and simulations performed by the inventors.

It was confirmed, as illustrated in FIG. 4, that the cooling loss in the turbine 30 is minimized when the angle θ is set to [10°] and the cooling loss increases as the angle θ is away from [10°] when the length L is set to [10 mm].

It was also confirmed, as illustrated in FIG. 5, that the cooling loss in the turbine 30 is minimized when the angle θ is set to [20°] and the cooling loss increases as the angle θ is away from [20°] when the length L is set to [20 mm].

These relationships show that the cooling loss in the turbine 30 is minimized when the numerical value of the length L (for example, [10] at a time of L=[10 mm]) and the numerical value of the angle θ (for example, [10] at a time of angle θ=[10°]) are equal to each other in the area where the length L is small (0≤L<25). These relationships also show that the cooling loss increases as the absolute value (=|θ−L|) of the difference between the numerical value of the length L and the numerical value of the angle θ increases.

Figure 6:
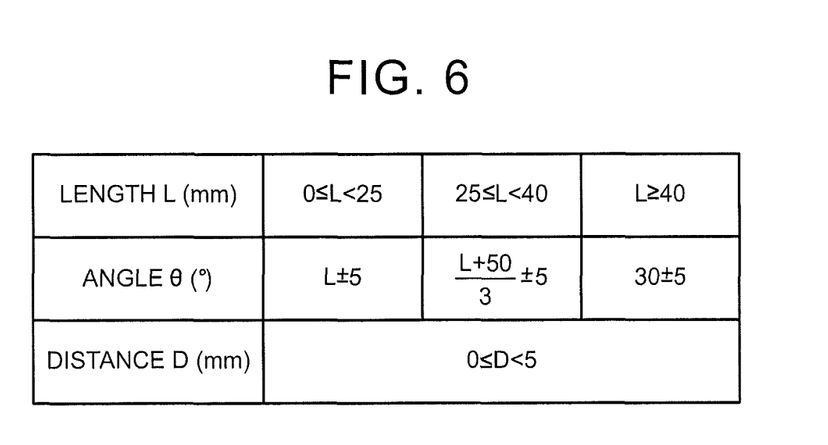
FIG. 6 is a table illustrating a relationship between the length of the extending portion, the angle of the inner surface of the extending portion, and the distance between the extending portion and a blade tip of the turbine wheel according to the embodiment.
Figure 7:
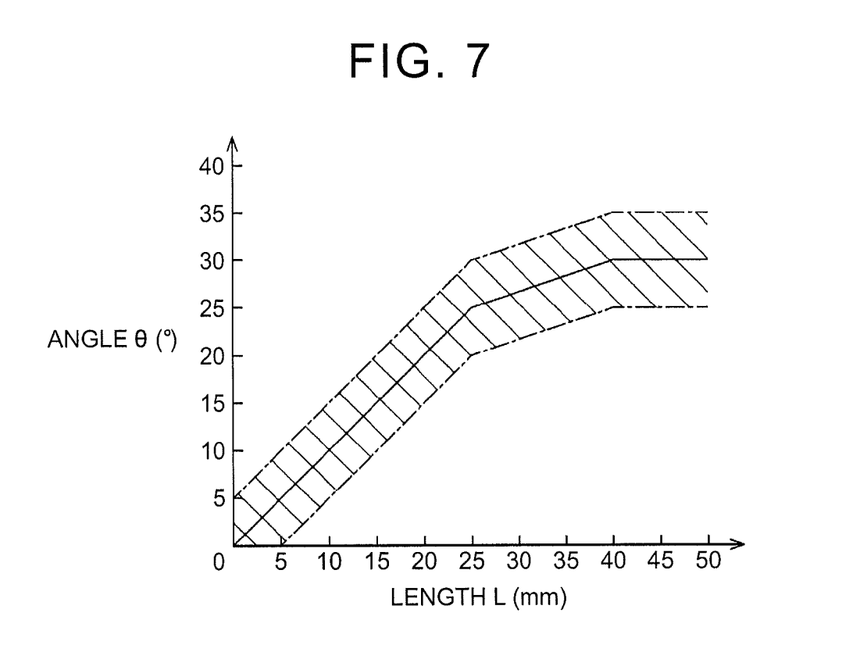
FIG. 7 is a graph illustrating a relationship between the length of the extending portion and the angle of the inner surface of the extending portion according to the embodiment.

Accordingly, in this area, it is desirable to set the angle θ and the length L within a range to which a predetermined width is given around a relational expression [θ=L] (θ=L±5, range illustrated by the dashed line in FIG. 7) as illustrated in FIGS. 6 and 7.

Figure 8:
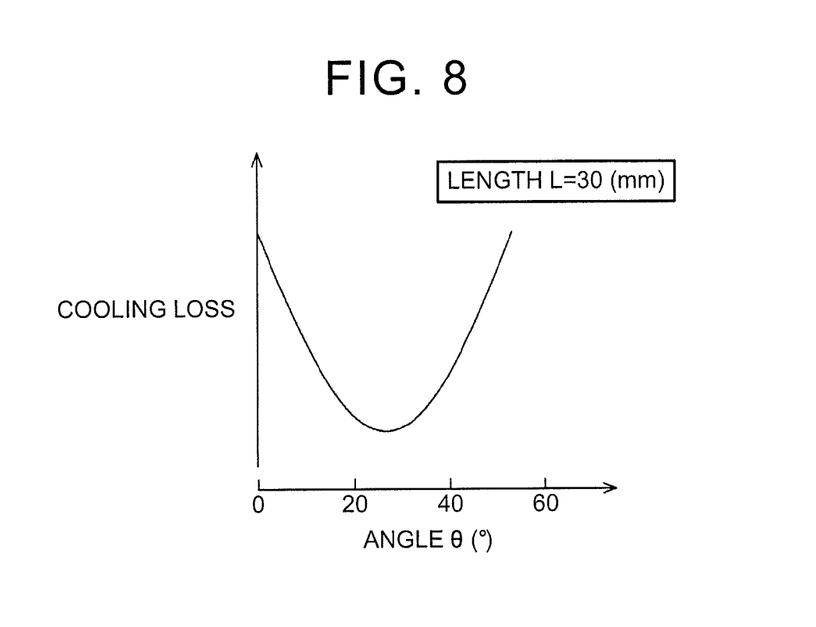
FIG. 8 is a graph illustrating a relationship between the length of the extending portion, the angle of the inner surface of the extending portion, and the cooling loss according to the embodiment.

FIG. 8 illustrates an example of a relationship between the length L, the angle θ, and the cooling loss in the turbine 30 in an area where the length L is medium (25≤L<40), which is a relationship obtained from results of various experiments and simulations performed by the inventors.

It was confirmed, as illustrated in FIG. 8, that the cooling loss is minimized when the numerical value of the length L and the numerical value of the angle θ satisfy a relational expression [θ=(L+50)/3] in the area where the length L is medium (25≤L<45) and the cooling loss increases as the absolute value (=|θv−θ|) of the difference between the "θv" satisfying the relational expression and the actual θ increases. In the example illustrated in FIG. 8, the cooling loss in the turbine 30 is minimized when the length L is set to [30 mm] and the angle θ is set to approximately [27°] and the cooling loss increases as the angle θ is away from approximately [27°].

Accordingly, in this area, it is desirable to set the angle θ and the length L within a range to which a predetermined width is given around the value satisfying the relational expression (range satisfying a relational expression [θ=(L+50)/3±5], range illustrated by the dashed line in FIG. 7) as illustrated in FIGS. 6 and 7.

Figure 9:
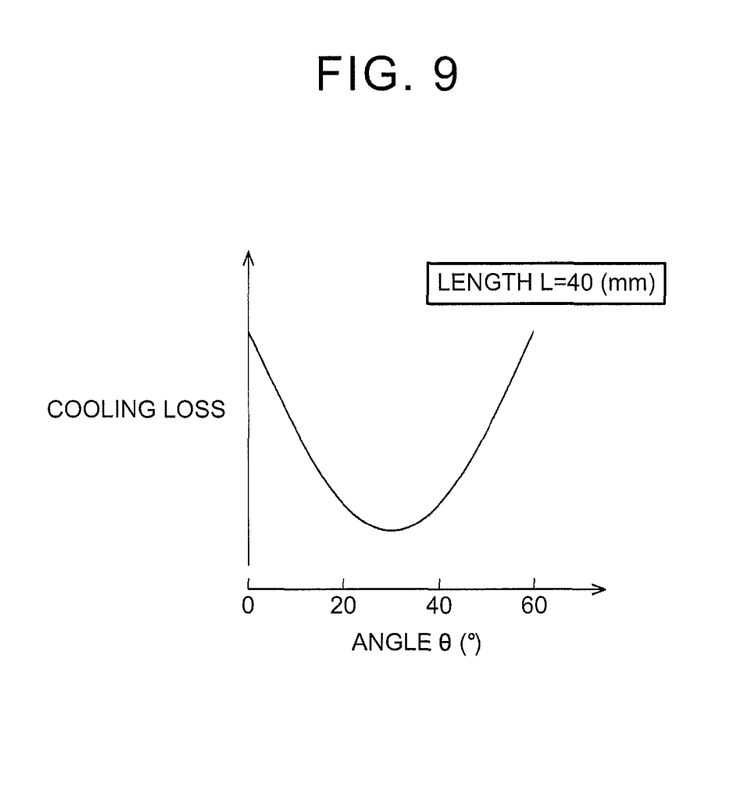
FIG. 9 is a graph illustrating a relationship between the length of the extending portion, the angle of the inner surface of the extending portion, and the cooling loss according to the embodiment.

FIG. 9 illustrates an example of a relationship between the length L, the angle θ, and the cooling loss in the turbine 30 in an area where the length L is relatively large (L≥40), which is a relationship obtained from results of various experiments and simulations performed by the inventors.

It was confirmed, as illustrated in FIG. 9, that the cooling loss in the turbine 30 is minimized when the angle θ is [30°] and the cooling loss increases as the angle θ is away from [30°] in the area where the length L is large (L≥40) without depending on the length L. In the example illustrated in FIG. 9, the length L is set to [40 mm] and the cooling loss in the turbine 30 is minimized when the angle θ is set to [30°] and the cooling loss increases as the angle θ is away from [30°]. Therefore, in this area, it is desirable to set the angle θ within a range to which a predetermined width is given around [30°] (30°±5°) as illustrated in FIGS. 6 and 7.

As a result of various experiments and simulations, the inventors confirmed that a cooling loss reduction effect can be achieved with the extending portion 40 disposed when the distance D is shortened. Accordingly, it is desirable that the distance D is set within a predetermined range including "zero" (0≤D<10, range illustrated by the dashed line in FIG. 5) as illustrated in FIG. 6.

In the turbine housing 31 of this embodiment, the length L is set to [25 mm], the angle θ is set to [25°], and the distance D is set to [3 mm]. In the turbine housing 31, the length L, the angle θ, and the distance D are determined as described above. Thus, the heat transfer rate can be reduced by reducing the exhaust gas flow rate in the duct portion 34 and the increase in the heat transfer amount from the exhaust gas to the turbine housing 31 caused by the increase in the internal surface area of the duct portion 34 is suppressed. As a result, the unnecessary rise in the temperature of the coolant caused when the heat from the exhaust gas is received can be suppressed appropriately.

The following effects can be achieved by the embodiment described above. The portion (extending portion 40) of the duct portion 34 further on the exhaust gas downstream side than the turbine wheel 33 is formed to have the tapered shape so that the inner diameter gradually increases toward the exhaust gas downstream side. Accordingly, the unnecessary rise in the temperature of the coolant caused when the heat from the exhaust gas is received can be suppressed and an increase in the capacity of the radiator 6 can be suppressed.

The embodiment described above may be modified as follows. The length L of the extending portion 40, the angle θ, and the distance D can be changed to any values if the relationships illustrated in FIGS. 6 and 7 are satisfied.

The relationship between the length L of the extending portion 40, the angle θ, and the distance D is not limited to the relationships illustrated in FIGS. 6 and 7 and can be changed to any relationship. The relationship may be determined for each of turbine housings having different specifications and appropriate relationships may be determined by performing various experiments and simulations and based on results of the experiments and the simulations.

The shape of the extending portion 40 can be changed to any shape if the shape has an inner diameter increasing toward the exhaust gas downstream side. With the turbine housing, the flow rate of the exhaust gas that passes through the extending portion can be reduced, and thus the heat transfer rate between the exhaust gas and the turbine housing can be reduced.

According to the turbine housing and the turbocharger described above, the passage cross-sectional area of the first portion of the exhaust gas flow path further on the exhaust gas downstream side than the turbine wheel gradually increases toward the exhaust gas downstream side. Accordingly, the flow rate of the exhaust gas in the first portion (extending portion) can be lower than when the exhaust gas flow path is shaped to extend with a constant inner diameter. Accordingly, a temperature boundary layer that is formed on an inner surface of the extending portion during the passage of the exhaust gas can be thickened. Thus, the heat transfer rate between the exhaust gas and the turbine housing can be reduced. As a result, an unnecessary rise in the temperature of the coolant caused when heat from the exhaust gas is received can be suppressed, and an increase in the capacity of a radiator of a cooling system including the coolant passage can be suppressed.

What is claimed is:

1. A turbine housing for an internal combustion engine, the turbine housing comprising:
 a coolant passage; and
 an exhaust gas flow path configured to pass exhaust gas of the internal combustion engine, a turbine wheel being arranged in the exhaust gas flow path and having an axis of rotation, the exhaust gas flow path including an extending portion, the extending portion being disposed downstream of the turbine wheel in the exhaust gas flow path, and an inner diameter of the extending portion gradually increasing toward the exhaust gas downstream side, wherein
the extending portion has an inner surface having a length L in a direction of the axis of rotation, and
the inner surface forms an angle θ with the axis of rotation,
when 0≤L<25 mm, θ=L±5°,
when 25 mm≤L<40 mm, θ=[(L+50)/3]°±5°, and
when L≥40 mm, θ=30°±5°.

2. A turbocharger for an internal combustion engine, the internal combustion engine including an intake pipe and an exhaust gas pipe, the turbocharger comprising:
a compressor;
(i) disposed in the intake pipe; and
(ii) including a compressor housing and a compressor impeller, the compressor impeller being disposed in the compressor housing;
a turbine:
(iii) disposed in the exhaust gas pipe;
(iv) including a turbine housing and a turbine wheel, the turbine wheel being disposed in the turbine housing and having an axis of rotation; and
(v) including a coolant passage and an exhaust gas flow path, the exhaust gas flow path being configured to pass exhaust gas of the internal combustion engine, the exhaust gas flow path including an extending portion, the extending portion being disposed downstream of the turbine wheel in the exhaust gas flow path, and an inner diameter of the extending portion gradually increasing toward the exhaust gas downstream side;
a bearing housing connecting the compressor housing and the turbine housing to each other; and
a rotating shaft connecting the compressor impeller and the turbine wheel to each other and rotatably supported by a bearing portion of the bearing housing,
wherein
the extending portion has an inner surface having a length L in a direction of the axis of rotation, and
the inner surface forms an angle θ with the axis of rotation,
when 0≤L<25 mm, θ=L±5°,
when 25 mm≤L<40 mm, θ=[(L+50)/3]°±5°, and
when L≥40 mm, θ=30°±5°.

* * * * *